(12) United States Patent
Smith et al.

(10) Patent No.: US 6,877,026 B2
(45) Date of Patent: Apr. 5, 2005

(54) BULK IMPORT IN A DIRECTORY SERVER

(75) Inventors: Mark C. Smith, Saline, MI (US); David W. Boreham, Livingston, MT (US); Gilles Bellaton, St. Martin d'Heres (FR); Robey Pointer, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 543 days.

(21) Appl. No.: 09/877,706

(22) Filed: Jun. 8, 2001

(65) Prior Publication Data

US 2002/0188617 A1 Dec. 12, 2002

(51) Int. Cl.[7] .............................................. G06F 15/16
(52) U.S. Cl. ......................... 709/203; 707/10; 709/219
(58) Field of Search ............................. 707/200–206, 707/1, 10; 709/217–219, 229, 203; 719/310–320

(56) References Cited

U.S. PATENT DOCUMENTS

| | | | | |
|---|---|---|---|---|
| 5,774,552 A | | 6/1998 | Grimmer | 380/25 |
| 6,157,942 A | * | 12/2000 | Chu et al. | 709/203 |
| 6,209,036 B1 | * | 3/2001 | Aldred et al. | 709/229 |
| 6,377,950 B1 | * | 4/2002 | Peters et al. | 707/10 |

OTHER PUBLICATIONS

Netscape Directory Server Version 4.1, Deployment Guide, Chapter 4, Planning Directory Schema, Directory Data Representation Overview, 5 pages, undated.
Netscape Directory Server Version 4.1, Administrator's Guide, Chapter 4, "Managing Directory Server Databases", 27 pages, undated.

* cited by examiner

*Primary Examiner*—St. John Courtenay, III
(74) *Attorney, Agent, or Firm*—Osha & May L.L.P.

(57) ABSTRACT

A method of bulk import in a directory server, including defining an extended operation on a server and a client, sending an extended operation request from the client to the server, performing the extended operation after receiving the extended operation request from the server, sending a response of the server back to the client specifying an object identifier of the extended operation and data specific to the extended operation; and performing a series of LDAP add operations framed by extended operations to import an entry into the directory server. A bulk import system for a directory server, including a processor, a memory, extended operations defined on a server and a client, and software instructions residing in memory executable on the processor for performing a series of LDAP add operations framed by extended operations to import an entry into the directory server.

24 Claims, 12 Drawing Sheets

| Open Digital Marketplaces/Applications 40 |

| Portal Services 42 |
|---|
| Knowledge Management 50 | Security 52 | Personalization 54 | Aggregation 56 | Presentation 58 |

| Communication Services 44 |
|---|
| Web Mail 60 | Calendar 62 | Wireless 64 | Instant Messaging 66 | Unified Messaging 68 |

| Web, Application, and Integration Services 46 |
|---|
| Web Server 70 | Application Server 72 | B2B Integration 74 | EAI Integration 76 | Business Process Automation 78 |

| Unified User Management Services 48 |
|---|
| Directory Server 80 | Meta Directory 82 | Delegated Administration 84 | PKI 86 | Policy 88 |

Internet Service Deployment Platform

| Operating System 30 |

| Network & Systems Infrastructure 32 |

*(PRIOR ART)*
*FIGURE 2*

Entry 124

| Attribute Types 120 | Attribute Values 122 |
|---|---|
| cn: | Barbara Jensen<br>Babs Jensen |
| sn: | Jensen |
| telephonenumber: | +1 408 555 1212 |
| mail: | babs@airius.com |

*(PRIOR ART)*
*FIGURE 6*

BULK IMPORT IN A DIRECTORY SERVER

BACKGROUND OF THE INVENTION

The most fundamental program resident on any computer is the operating system (OS). Various operating systems exist in the market place, including Solaris™ from Sun Microsystems Inc., Palo Alto, Calif. (Sun Microsystems), MacOS from Apple Computer, Inc., Cupertino, Calif., Windows NT®, from Microsoft Corporation, Redmond, Wash., UNIX, and Linux. The combination of an OS and its underlying hardware is referred to herein as a "traditional platform". Prior to the popularity of the Internet, software developers wrote programs specifically designed for individual traditional platforms with a single set of system calls and, later, application program interfaces (APIs). Thus, a program written for one platform could not be run on another. However, the advent of the Internet made cross-platform compatibility a necessity and a broader definition of a platform has emerged. Today, the original definition of a traditional platform (OS/hardware) dwells at the lower layers of what is commonly termed a "stack," referring to the successive layers of software required to operate in the environment presented by the Internet and World Wide Web.

Prior art FIG. 1 illustrates a conceptual arrangement wherein a first computer (2) running the Solaris™ platform and a second computer (4) running the Windows® NT platform are connected to a server (8) via the Internet (6). A resource provider using the server (8) might be any type of business, governmental, or educational institution. The resource provider (8) needs to be able to provide its resources to both the user of the Solaris™ platform and the user of the Windows® 98 platform, but does not have the luxury of being able to custom design its content for the individual traditional platforms.

Effective programming at the application level requires the platform concept to be extended all the way up the stack, including all the new elements introduced by the Internet. Such an extension allows application programmers to operate in a stable, consistent environment.

iPlanet™ E-commerce Solutions, a Sun Microsystems|Netscape Alliance, has developed a net-enabling platform shown in FIG. 2 called the Internet Service Deployment Platform (ISDP) (28). ISDP (28) gives businesses a very broad, evolving, and standards-based foundation upon which to build an e-enabled solution.

ISDP (28) incorporates all the elements of the Internet portion of the stack and joins the elements seamlessly with traditional platforms at the lower levels. ISDP (28) sits on top of traditional operating systems (30) and infrastructures (32). This arrangement allows enterprises and service providers to deploy next generation platforms while preserving "legacy-system" investments, such as a mainframe computer or any other computer equipment that is selected to remain in use after new systems are installed.

ISDP (28) includes multiple, integrated layers of software that provide a full set of services supporting application development, e.g., business-to-business exchanges, communications and entertainment vehicles, and retail Web sites. In addition, ISDP (28) is a platform that employs open standards at every level of integration enabling customers to mix and match components. ISDP (28) components are designed to be integrated and optimized to reflect a specific business need. There is no requirement that all solutions within the ISDP (28) are employed, or any one or more is exclusively employed.

In a more detailed review of ISDP (28) shown in FIG. 2, the iPlanet™ deployment platform consists of the several layers. Graphically, the uppermost layer of ISDP (28) starts below the Open Digital Marketplace/Application strata (40).

The uppermost layer of ISDP (28) is a Portal Services Layer (42) that provides the basic user point of contact, and is supported by integration solution modules such as knowledge management (50), personalization (52), presentation (54), security (56), and aggregation (58).

Next, a layer of specialized Communication Services (44) handles functions such as unified messaging (68), instant messaging (66), web mail (60), calendar scheduling (62), and wireless access interfacing (64).

A layer called Web, Application, and Integration Services (46) follows. This layer has different server types to handle the mechanics of user interactions, and includes application and Web servers. Specifically, iPlanet™ offers the iPlanet™ Application Server (72), Web Server (70), Process Manager (78), Enterprise Application and Integration (EAI) (76), and Integrated Development Environment (IDE) tools (74).

Below the server strata, an additional layer called Unified User Management Services (48) is dedicated to issues surrounding management of user populations, including Directory Server (80), Meta-directory (82), delegated administration (84), Public Key Infrastructure (PKI) (86), and other administrative/access policies (88). The Unified User Management Services layer (48) provides a single solution to centrally manage user account information in extranet and e-commerce applications. The core of this layer is iPlanet™ Directory Server (80), a Lightweight Directory Access Protocol (LDAP)-based solution that can handle more than 5,000 queries per second.

iPlanet™ Directory Server (iDS) provides a centralized directory service for an Intranet or extranet while integrating with existing systems. The term directory service refers to a collection of software, hardware, and processes that store information and make the information available to users. The directory service generally includes at least one instance of the iDS and one or more directory client programs. Client programs can access names, phone numbers, addresses, and other data stored in the directory.

One common directory service is a Domain Name System (DNS) server. The DNS server maps computer host names to Internet Protocol (IP) addresses. Thus, all of the computing resources (hosts) become clients of the DNS server. The mapping of host names allows users of the computing resources to easily locate computers on a network by remembering host names rather than numerical IP addresses. The DNS server only stores two types of information, but a typical directory service stores virtually unlimited types of information.

The iDS is a general-purpose directory that stores all information in a single, network-accessible repository. The iDS provides a standard protocol and application programming interface (API) to access the information contained by the iDS.

The iDS provides global directory services, meaning that information is provided to a wide variety of applications. Until recently, many applications came bundled with a proprietary database. While a proprietary database can be convenient if only one application is used, multiple databases become an administrative burden if the databases manage the same information. For example, in a network that supports three different proprietary e-mail systems where each system has a proprietary directory service, if a user changes passwords in one directory, the changes are not automatically replicated in the other directories. Managing multiple instances of the same information results in increased hardware and personnel costs.

The global directory service provides a single, centralized repository of directory information that any application can access. However, giving a wide variety of applications access to the directory requires a network-based means of communicating between the numerous applications and the single directory. The iDS uses LDAP to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

X.500 and X.400 are the corresponding Open Systems Interconnect (OSI) standards. LDAP supports X.500 Directory Access Protocol (DAP) compatibilities and can easily be embedded in lightweight applications (both client and server) such as email, web browsers, and groupware. LDAP originally enabled lightweight clients to communicate with X.500 directories. LDAP offers several advantages over DAP, including that LDAP runs on TCP/IP rather than the OSI stack, LDAP makes modest memory and CPU demands relative to DAP, and LDAP uses a lightweight string encoding to carry protocol data instead of the highly structured and costly X.500 data encodings.

An LDAP-compliant directory, such as the iDS, leverages a single, master directory that owns all user, group, and access control information. The directory is hierarchical, not relational, and is optimized for reading, reliability, and scalability. This directory becomes the specialized, central repository that contains information about objects and provides user, group, and access control information to all applications on the network. For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system he or she needs to access, a single directory entry is created for the user in the LDAP directory. FIG. 3 shows a portion of a typical directory with different entries corresponding to real-world objects. The directory depicts an organizational entry (90) with the attribute type of domain component (dc), an organizational unit entry (92) with the attribute type of organizational unit (ou), a server application entry (94) with the attribute type of common name (cn), and a person entry (96) with the attribute type of user ID (uid). All entries are connected by the directory.

Understanding how LDAP works starts with a discussion of an LDAP protocol. The LDAP protocol is a message-oriented protocol. The client constructs an LDAP message containing a request and sends the message to the server. The server processes the request and sends a result or results back to the client as a series of LDAP messages. Referring to FIG. 4, when an LDAP client (100) searches the directory for a specific entry, the client (100) constructs an LDAP search request message and sends it the message to the LDAP server (102) (step 104). The LDAP server (102) retrieves the entry from the database and sends the entry to the client (100) in an LDAP message (step 106). A result code is also returned to the client (100) in a separate LDAP message (step 108).

LDAP-compliant directory servers, like the iDS, have nine basic protocol operations, which can be divided into three categories. The first category is interrogation operations, which include search and compare operators. These interrogation operations allow questions to be asked of the directory. The LDAP search operation is used to search the directory for entries and retrieve individual directory entries. No separate LDAP read operation exists. The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operators.

The bind operator allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

A typical complete LDAP client/server exchange might proceed as depicted in FIG. 5. First, the LDAP client (100) opens a TCP connection to the LDAP server (102) and submits the bind operation (step 111). This bind operation includes the name of the directory entry that the client wants to authenticate as, along with the credentials to be used when authenticating. Credentials are often simple passwords, but they might also be digital certificates used to authenticate the client (100). After the directory has verified the bind credentials, the directory returns a success result to the client (100) (step 112). Then, the client (100) issues a search request (step 113). The LDAP server (102) processes this request, which results in two matching entries (steps 114 and 115). Next, the LDAP server (102) sends a result message (step 116). The client (100) then issues the unbind request (step 117), which indicates to the LDAP server (102) that the client (100) wants to disconnect. The LDAP server (102) obliges by closing the connection (step 118).

By combining a number of these simple LDAP operations, directory-enabled clients can perform useful, complex tasks. For example, an electronic mail client can look up mail recipients in a directory, and thereby, help a user address an e-mail message.

The basic unit of information in the LDAP directory is an entry, a collection of information about an object. Entries are composed of a set of attributes, each of which describes one particular trait of an object. Attributes are composed of an attribute type (e.g., common name (cn), surname (sn), etc.) and one or more values. FIG. 6 shows an exemplary entry (124) showing attribute types (120) and values (122). Attributes may have constraints that limit the type and length of data placed in attribute values (122). A directory schema places restrictions on the attribute types (120) that must be, or are allowed to be, contained in the entry (124).

SUMMARY OF INVENTION

In general, in one aspect, the present invention involves a method of bulk import in a directory server, comprising defining extended operations on a server and a client, importing an entry into the directory server through a series of LDAP add operations framed by extended operations, importing the entry remotely, importing state information within the entry, identifying extended operations by an object identifier, and suspending all operations except LDAP operations necessary for bulk import once bulk import commences. The extended operations specify an object identifier and data specific to extended operations.

In general, in one aspect, the present invention involves a method of bulk import in a directory server, comprising defining extended operations on a server and a client, importing an entry into the directory server through a series of LDAP add operations framed by extended operations, importing the entry remotely, importing state information within the entry, identifying extended operations by an object identifier, and suspending all operations except LDAP operations necessary for bulk import once bulk import commences. The extended operations specify an object identifier and data specific to extended operations.

In general, in one aspect, the present invention involves a method of bulk import in a directory server, comprising defining an extended operation on a server and a client, sending an extended operation request from the client to the server, performing the extended operation after receiving the extended operation request from the server, sending a response of the server back to the client specifying an object identifier of the extended operation and data specific to the extended operation, performing a series of LDAP add operations framed by extended operations to import an entry into the directory server; importing the entry remotely, importing state information within the entry, identifying extended operations by an object identifier, and suspending all operations except LDAP operations necessary for bulk import when bulk import commences.

In general, in one aspect, the present invention involves a bulk import system for a directory server, comprising a processor, a memory, extended operations defined on a server and a client, and software instructions residing in memory executable on the processor for performing a series of LDAP add operations framed by extended operations to import an entry into the directory server, a back-end portion for use by a fast replica initialization component, and a wire import component, state information contained within the entry, and an object identifier that identifies the extended operation.

In general, in one aspect, the present invention involves a bulk import apparatus for a directory server, comprising means for defining an extended operation on a server and a client, means for sending an extended operation request from the client to the server, means for performing the extended operation after receiving the extended operation request from the server, means for sending a response of the server back to the client specifying an object identifier of the extended operation and data specific to the extended operation, and means for performing a series of LDAP add operations framed by extended operations to import an entry into the directory server.

Other aspects and advantages of the invention will be apparent from the following description and the appended claims.

BRIEF DESCRIPTION OF DRAWINGS

FIG. 2 illustrates a block diagram of iPlanet™ Internet Service Development Platform.

FIG. 6 illustrates a directory entry showing attribute types and values.

DETAILED DESCRIPTION

Figure 1:
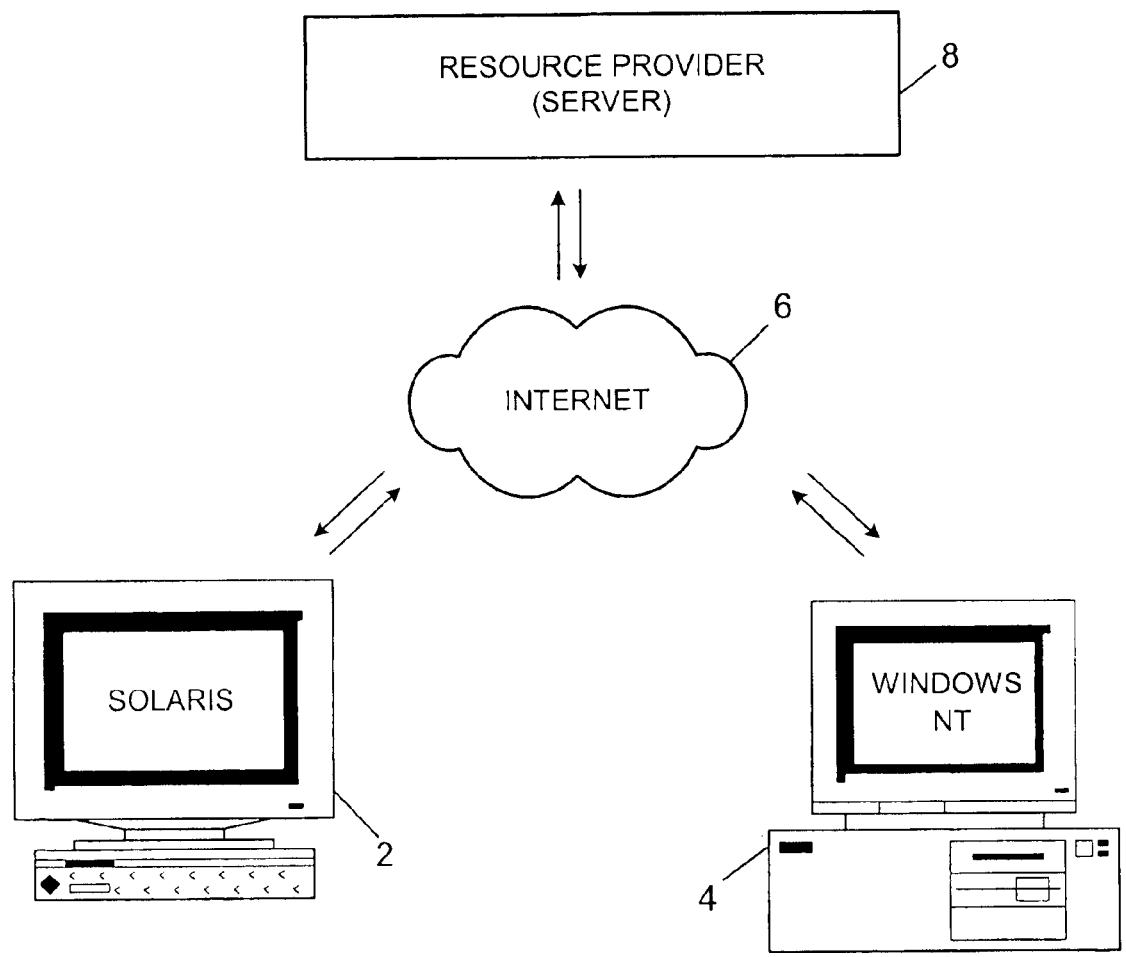
FIG. 1 illustrates a multiple platform environment.
Figure 3:
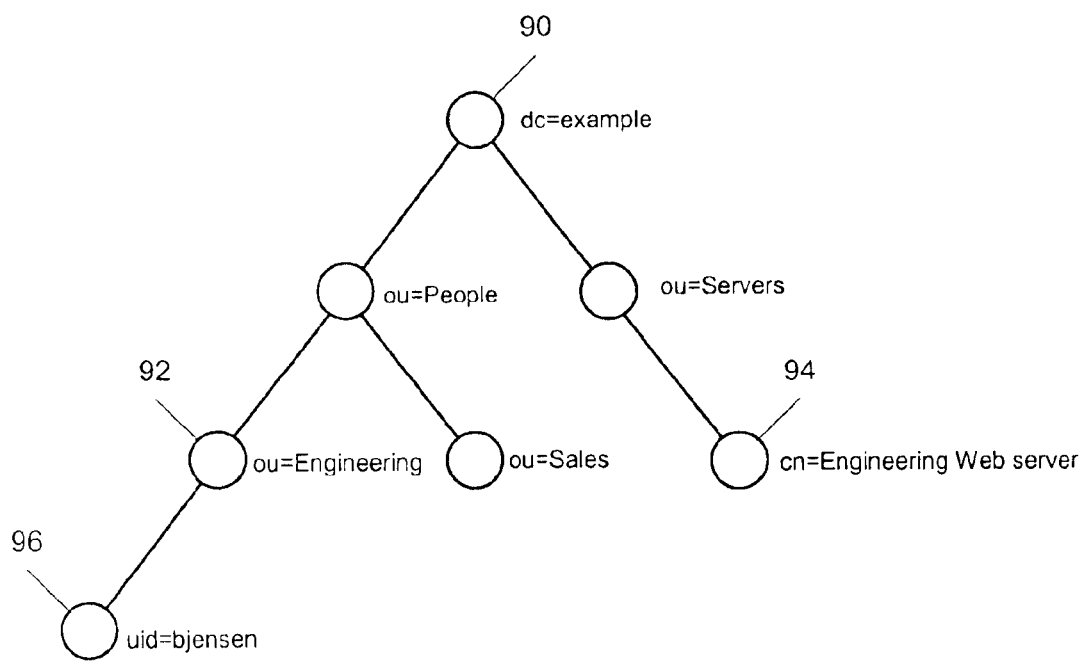
FIG. 3 illustrates part of a typical directory.
Figure 4:
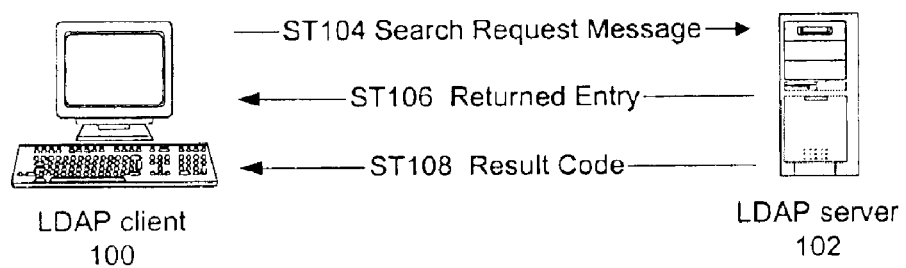
FIG. 4 illustrates the LDAP protocol used for a simple request.
Figure 5:
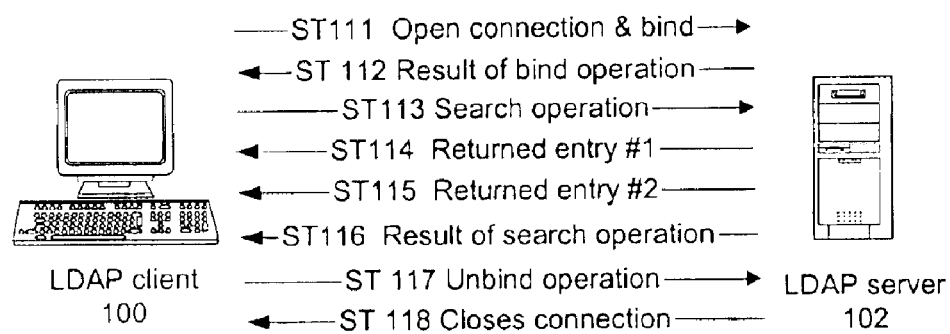
FIG. 5 illustrates a typical LDAP exchange between the LDAP client and LDAP server.

Specific embodiments of the invention will now be described in detail with reference to the accompanying figures. Like elements in the various figures are denoted by like reference numerals for consistency.

Figure 7:
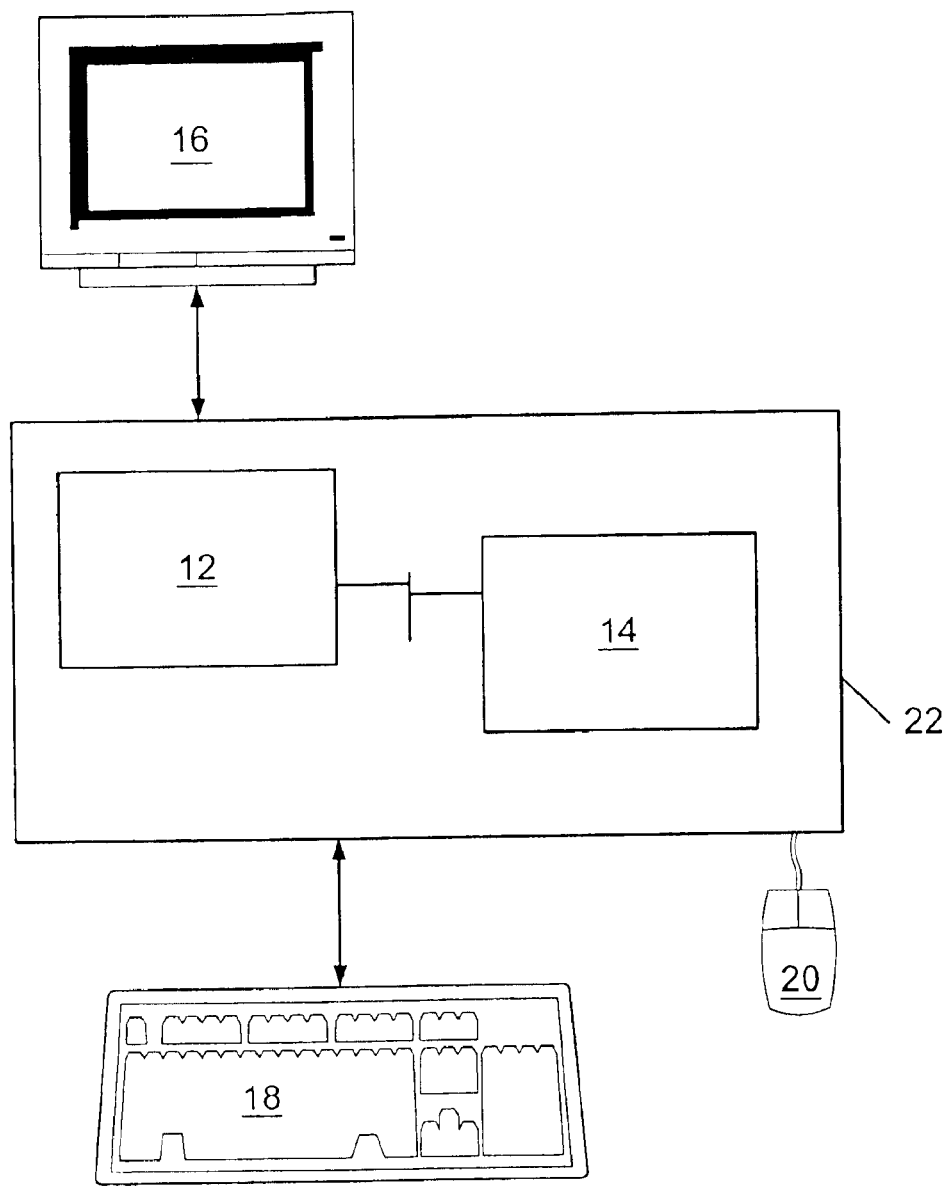
FIG. 7 illustrates a typical computer with components.

The invention described here may be implemented on virtually any type computer regardless of the traditional platform being used. For example, as shown in FIG. 7, a typical computer (22) has a processor (12), associated storage element (14), and numerous other elements and functionalities typical to today's computers (not shown). The computer (22) has associated therewith input means such as a keyboard (18) and a mouse (20), although in a given accessible environment these input means may take other forms. The computer (22) is also associated with an output device such as a display (16), which also may take a different form in a given accessible environment.

Directory servers have been used as a corporate infrastructure component for over a decade. The directory server concept has evolved substantially over this time. Today, the directory industry roughly comprises three major categories: Network Operating Systems (NOS) Directories, Meta-directories, and Application Directories.

Figure 8:
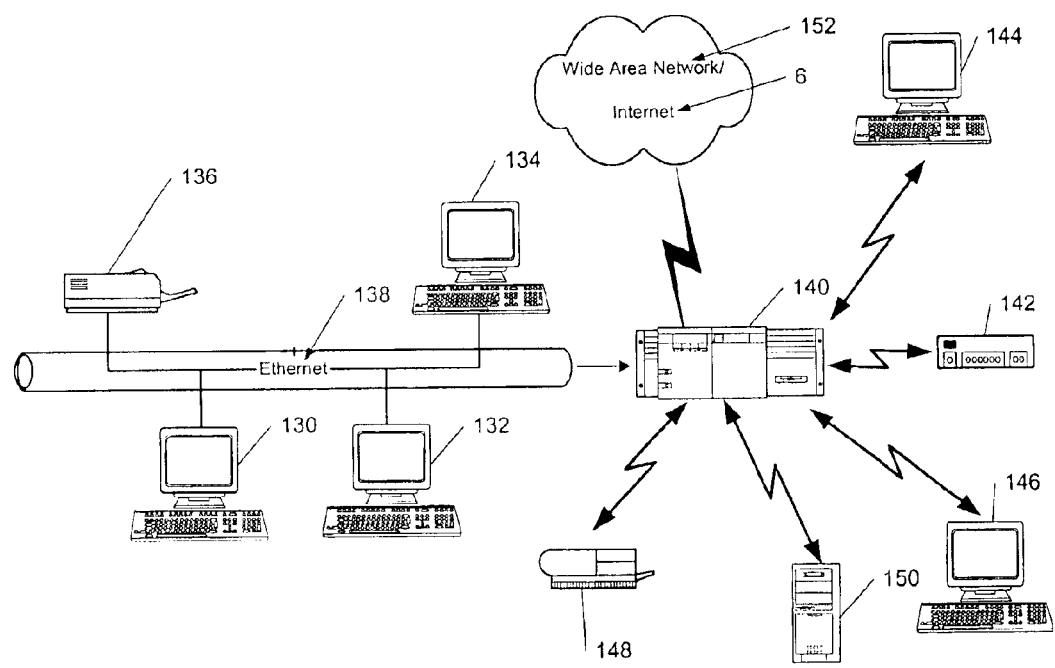
FIG. 8 illustrates a typical networked workgroup.

NOS directories are the oldest of the three major categories. These directories serve as information storage systems for the NOS. NOS directories are designed to support print-sharing and file-sharing requirements for small to medium-sized networked workgroups as shown in FIG. 8.

The network workgroup shows a first client (130), a second client (132), a third client (134), and a shared printer (136) with an Ethernet connection (138) at one location. Using a router (140), a connection is made to a remote network via a hub (142). Connected to the hub (142) is a remote shared printer (148), a first remote client (144), a second remote client (146), and a file server (150). The entire networked workgroup is able to connect to a wide area network (152) or the Internet (6) via the router (140). NOS directories are also tightly integrated with the operating system. Typical NOS directories include Microsoft® NT Domain Directory and Active Directory for Windows® 2000, Novell Directory Services (NDS), and Sun Microsystems Network Information Service (NIS) for UNIX.

Meta-directories are a result of the increase in the requirements of the directory server due to the increased usage of e-mail communication. Meta-directories use standard protocols and proprietary connections for synchronizing e-mail systems. Further, Meta-directories integrate key legacy data-systems into a standards-based directory for use by one or more corporate Intranet applications.

Application directories store user information, such as employee, partner, vendor, and customer information, in a single repository for access by multiple applications across multiple heterogeneous systems for up to millions of users. Application directories provide storage for user information, user authentication and access control, and provide the foundation for security for many Internet applications. The primary purpose of an application directory is to support Intranet and E-commerce applications. Application directories serve this role by having such features as Meta-directory capabilities, high-performance, scalability and reliability.

iPlanet™ Directory Server (iDS) is an application directory and delivers user-management infrastructure for managing large volumes of user information for e-business applications and services. The iDS is a high performance, scalable LDAP Server with an on-disk database. The iDS is able to function on a variety of platforms, including Windows® NT, Windows® 2000 and a wide range of UNIX compliant platforms.

The present invention involves a Bulk Import feature of the iDS, which is implemented as plug-in to an iDS back-end. Rapidly importing large quantities of data is often necessary for the iDS. Using the Bulk Import feature, data can be imported to populate directories, merge directories, perform replication activities, etc. When the feature is activated, all LDAP operations within the iDS are suspended except the operations necessary to accomplish the bulk import. The Bulk Import feature of the iDS imports data using several different methods, including a Fast Replica Initialization method, a Wire Import method, and a Direct Transfer method.

The Fast Replica Initialization method remotely transfers an entry containing state information (i.e., present state or deleted state for each attribute and value of an entry) into the iDS. During the Fast Replica Initialization method, the LDAP client imports entries remotely through a series of LDAP add operations, framed by extended operations. Each extended operation is identified by an Object Identifier (OID). The OID is a unique series of integers separated by periods where each OID is specific to a particular operation. The Fast Replica Initialization method starts when the LDAP client sends an extended operation request to the server. Within the request, the LDAP client specifies the OID of the extended operation to be performed and data specific to the extended operation. Next, the server receives the request and performs the extended operation. The server then sends a response back to the client specifying the OID of the extended operation and any additional data. In order to use extended operations, the extended operations are defined on both the server and the client.

Figure 9:
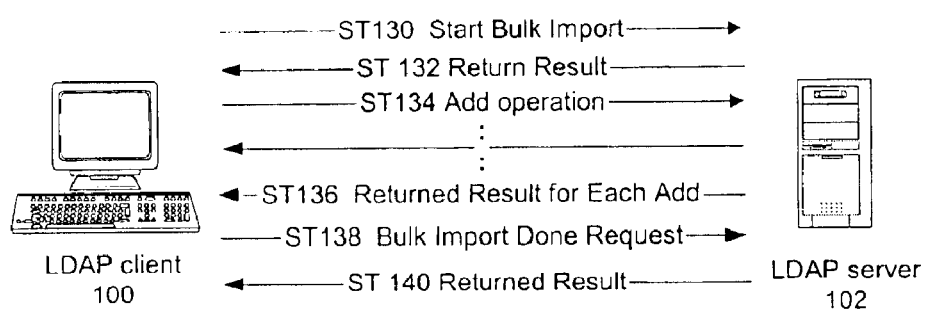
FIG. 9 illustrates atypical exchange between the LDAP client and LDAP server during a bulk import in accordance with one or more embodiments of the present invention.

Referring to FIG. 9, the Fast Replica Initialization method starts when an LDAP client (100) issues an OID for the "start bulk import" extended operation request to the LDAP server (102) and a suffix indicating the name of the back-end portion receiving the import, or an instance back-end name, as parameters (step 160). Next, the LDAP server (102) processes the request by performing the "start bulk import" extended operation. The LDAP server (102) then sends back to the LDAP client (100) a response containing the OID associated with the "start bulk import" extended operation (step 162). Next, the LDAP client (100) sends a plurality of LDAP add operation requests to the LDAP server (102) (step 164). The LDAP server (102) performs the LDAP add operation and returns a success result of each add operation to the client, if applicable (step 166). The LDAP client (100) then issues a request with the OID for the "bulk import done" extended operation (step 168), which indicates to the LDAP server (102) that the LDAP client (100) intends to stop the Fast Replica Initialization method. The LDAP server (102) performs the "bulk import done" extended operation and returns a result to the client containing the OID of the "bulk import done" extended operation and a message that indicating that the import has completed successfully (step 170).

Generally, the completion of the Fast Replica Initialization method is signified by the receipt of the "bulk import done" extended operation by the LDAP server. Alternatively, in the case of an error in communication such as a dropped connection before normal LDAP operations can resume within the iDS, an abort of the Fast Replica Initialization method signifies completion.

Figure 10:
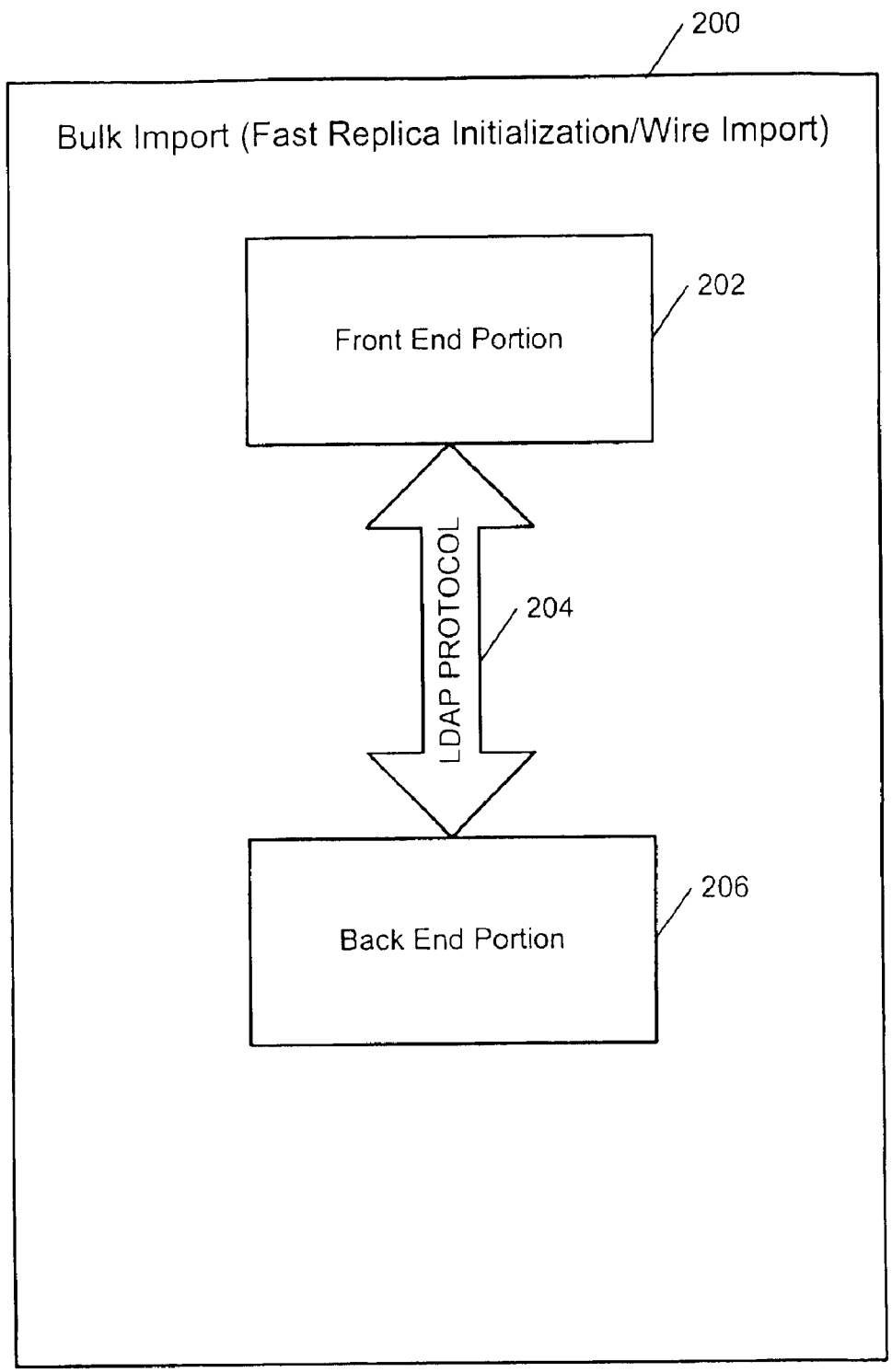
FIG. 10 illustrates a block diagram of the bulk import feature in accordance with one or more embodiments of the present invention.

As shown in FIG. 10, the Bulk Import feature (200), including Fast Replica Initialization method and the Wire Import method includes a front-end portion (202) and a back-end portion (206) with a connection whereby the LDAP protocol (204) is carried between the front-end portion (202) and the back-end portion (206).

Figure 11:
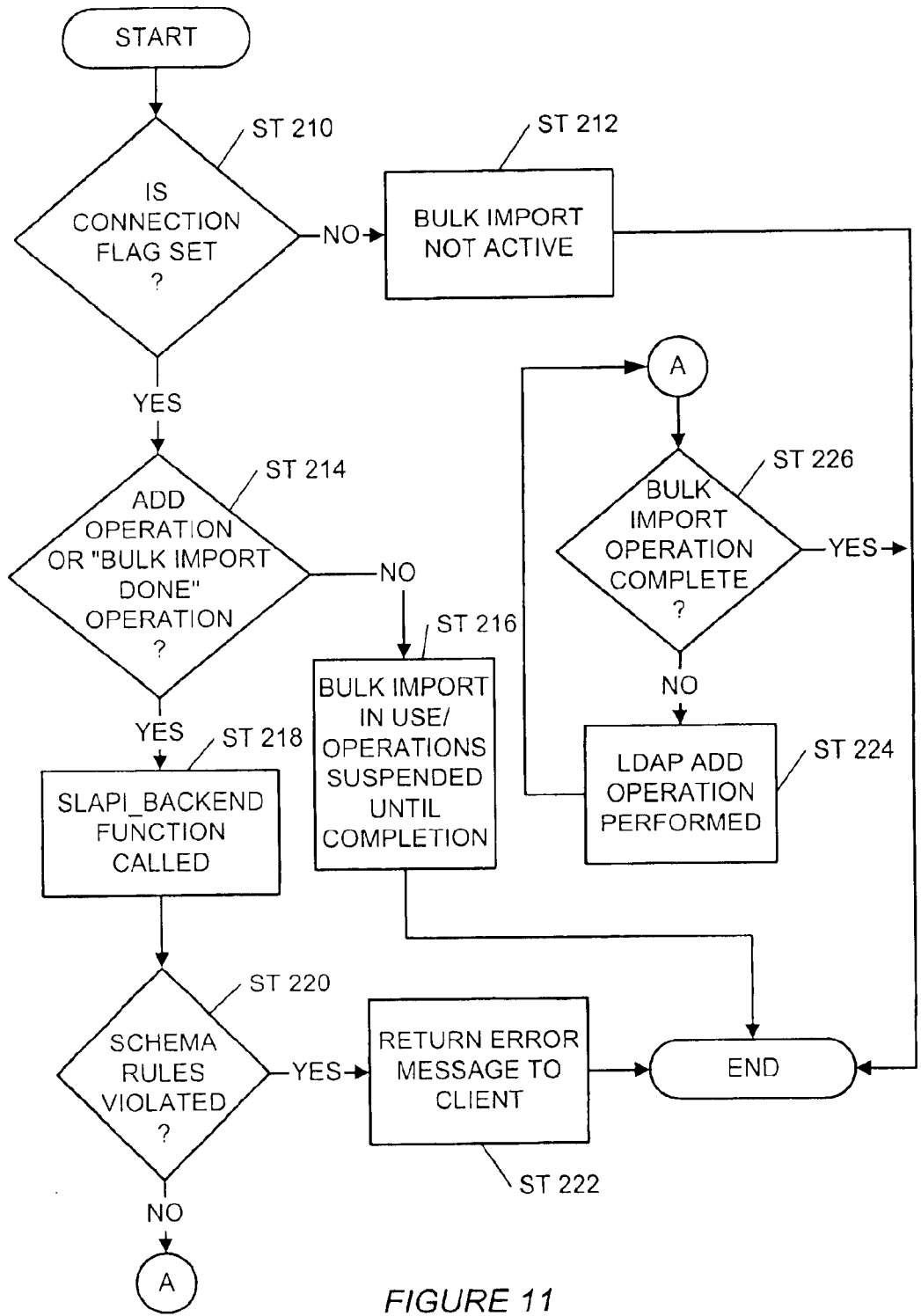
FIG. 11 illustrates a flowchart detailing the front end operations of the bulk import feature in accordance with one or more embodiments of the present invention.

Referring to FIG. 11, the front-end portion is able to track the status of the Bulk Import by marking a connection flag for a given connection. If the connection flag is not set, the Bulk Import feature is not active and cannot be started (step 212). If the connection flag is set (step 210), only the LDAP add operation pertaining to the Bulk Import feature and "bulk import done" extended operations are allowed (step 214). If an operation other than the necessary LDAP add operations or "bulk import done" operation is requested, the operation is suspended until the bulk import is completed (step 216). Next, the front-end portion calls a SLAPI_BACKEND function (a member of a connection data structure that is responsible for maintaining connection information) with a pointer indicating the specific back-end that is performing the bulk import (step 218). The front-end portion then performs schema checking (step 220) to ensure all new or modified directory entries conform to schema rules. If the schema rules are violated, the directory rejects the requested change and a constraint violation error is returned to the LDAP client (step 222). If the schema rules are not violated, the front-end portion calls a back-end function to perform the corresponding operation, which is either an LDAP add operation (step 224) or the "Bulk Import Done" extended operation (step 226).

Figure 12:
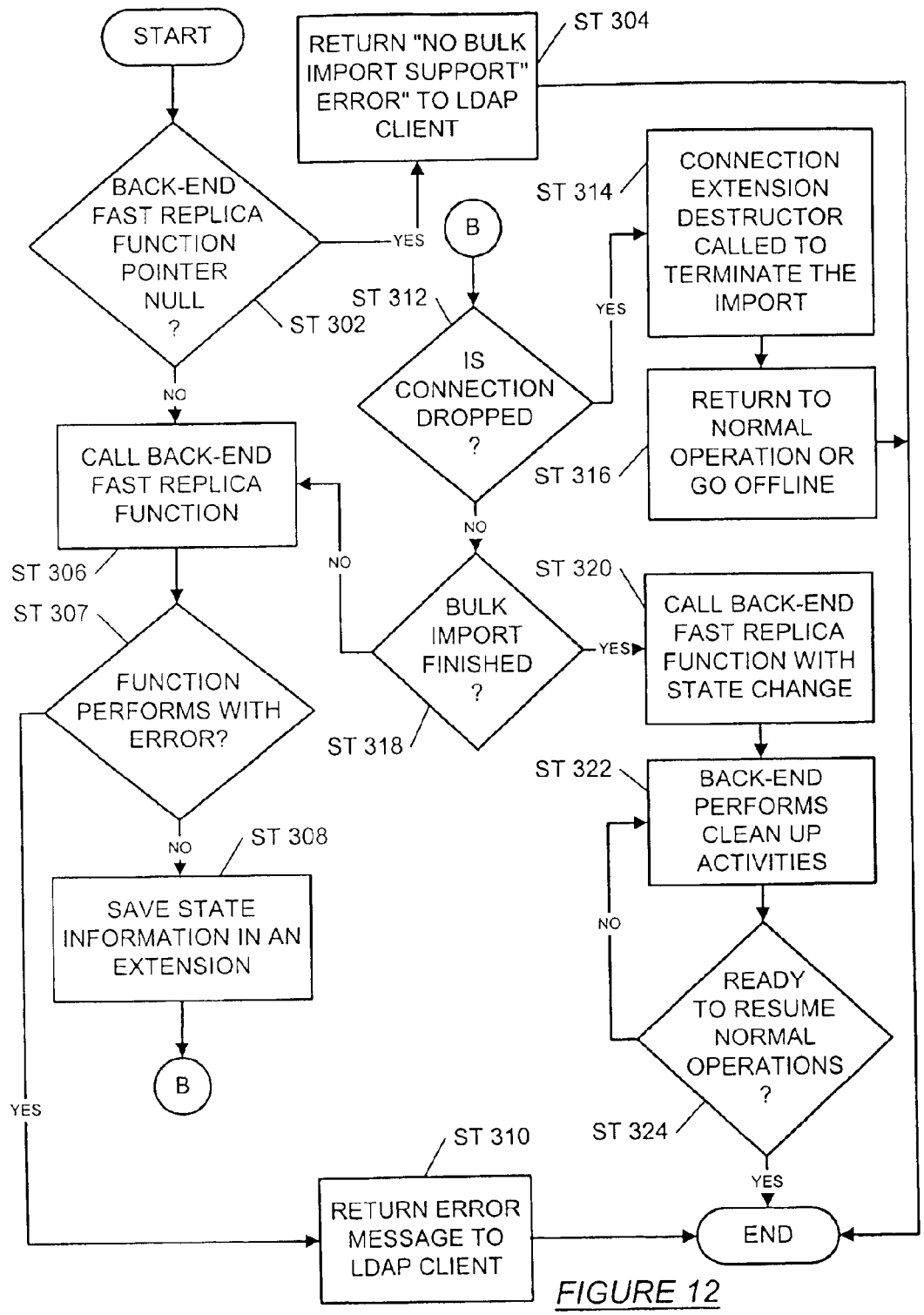
FIG. 12 illustrates a flowchart detailing the back end operations of the bulk import feature in accordance with one or more embodiments of the present invention

As shown in FIG. 12, the database plug-in for the back-end portion of the directory server supports the Bulk Import if a back-end fast replica function pointer is defined (step 301). However, if the back-end fast replica function is left NULL (step 302), then the database plug-in for the back-end portion does not support bulk import and the front-end portion returns an error to any LDAP clients attempting to access the back-end portion (step 304). If the back-end fast replica function is not NULL (step 302), then the back-end fast replica function is called, the previous contents of the back-end portion are lost, and several parameters are sent to the back-end portion (step 306). The parameters include: a name of a back-end server receiving the imported data, a specific connection pointer associated with this bulk import containing the identity of the user making the connection), the unique ID of a directory entry to add (as with normal adds, this entry becomes the property of the back-end), and a state indicating that the bulk import is underway. Once the bulk import has begun, the call to the back-end fast replica function is repeated for each LDAP add operation (step 306) with the same parameters listed above.

If the back-end fast replica function performs without error (step 307), the back-end portion saves any necessary state information in an extension on the connection (step 308). If the back-end fast replica function encounters errors (step 307), the back-end portion returns an error message to the LDAP client (step 310).

Alternatively, the Fast Replica Initialization method can be aborted by dropping the connection. If the connection is dropped (step 312), the connection extension's destructor is called to destroy the connection and terminate the input (step 314). Next, the iDS is either returned to the condition that existed prior to commencing the Fast Replica Initialization method or the iDS goes offline (step 316).

If the Fast Replica Initialization method completes (step 318), the back-end fast replica function is called again in the same manner as an LDAP add operation (step 320), however the state is changed to indicate that the bulk import is complete. Then, the back-end portion performs cleanup activities (step 322), which continues until the directory server is ready to resume normal operation (step 324).

The Wire Import method features a remote process that transfers an entry containing no state information. The Wire Import method imports an entry to the directory server through a series of LDAP add operations. When processing the LDAP add operation, the front-end portion of the Bulk Import feature calls a corresponding back-end portion to add the entry to the directory server. The Wire Import method performs the import of the entry in the same manner as the Fast Replica Initialization method except that the front-end portion does not use extended operations. The extended operations are not necessary because the entry does not contain state information. The Wire Import method uses the same back-end procedure as the Fast Replica Initialization method described above and shown in FIG. 12 except that there is no state information to save in step 308.

LDAP Data Interchange Format (LDIF) is used as a way to describe a directory and directory entries in a standard text-based format. LDIF allows a user to export directory data and import the data into another directory server, even if the servers use different internal database formats. There are two different types of LDIF files. The first type describes a set of directory entries, and the second describes changes to be applied to directory entries. The second type of LDIF file includes a series of LDIF update statements for describing the changes. With the Direct Transfer method, the LDIF file is physically transferred in a LDIF formatted file directly to the iDS using an administration console feature of the iDS. The Direct Transfer method does not use a connection over the wire.

Advantages of the present invention may include one or more of the following. The Bulk Import feature of the iDS provides increased reliability and performance of the directory service. Rapid importation into the directory service of entries that contain state information. Data integrity can be ensured by unique Ids. Also, the iDS is able to properly track imported data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of bulk import in a directory server, comprising:
   defining extended operations for bulk import on a server and a client; and
   importing a plurality of entries into the directory server through a series of LDAP add operations framed by extended operations for bulk import.

2. The method of claim 1, further comprising:
   importing the plurality of entries remotely.

3. The method of claim 1, further comprising:
   importing state information within the plurality of entries.

4. The method of claim 1, further comprising:
   identifying extended operations for bulk import by an object identifier.

5. The method of claim 1, further comprising:
   suspending all operations except LDAP operations necessary for bulk import when bulk import commences.

6. The method of claim 1, wherein the extended operations for bulk import specify an object identifier and data specific to extended operations.

7. A method of bulk import in a directory server, comprising:
   defining extended operations for bulk import on a server and a client;
   importing plurality of entries into the directory server through a series of LDAP add operations framed by extended operations for bulk import;
   importing the plurality of entries remotely;
   importing state information within the plurality of entries;
   identifying extended operations for bulk import by an object identifier; and
   suspending all operations except LDAP operations necessary for bulk import once bulk import commences,
   wherein the extended operations for bulk import specify an object identifier and data specific to extended operations.

8. A method of bulk import in a directory server, comprising:
   defining an extended operation for bulk import on a server and a client;
   sending an extended operation request from the client to the server;
   performing the extended operation for bulk import after receiving the extended operation request from the server;
   sending a response of the server back to the client specifying an object identifier of the extended operation and data specific to the extended operation; and
   performing a series of LDAP add operations framed by the extended operation for bulk import to import a plurality of entries into the directory server.

9. The method of claim 8, further comprising:
   importing the plurality of entries remotely.

10. The method of claim 8, further comprising:
    importing state information within the plurality of entries.

11. The method of claim 8, further comprising:
    identifying the extended operations for bulk import by an object identifier.

12. The method of claim 8, further comprising:
suspending all operations except LDAP operations necessary for bulk import when bulk import commences.

13. A method of bulk import in a directory server, comprising:
defining an extended operation for bulk import on a server and a client;
sending an extended operation request from the client to the server;
performing the extended operation for bulk import after receiving the extended operation request from the server;
sending a response of the server back to the client specifying an object identifier of the extended operation and data specific to the extended operation;
performing a series of LDAP add operations framed by the extended operation for bulk import a to import plurality of entries into the directory server;
importing the plurality of entries remotely;
importing state information within the plurality of entries;
identifying the extended operations for bulk import by an object identifier; and
suspending all operations except LDAP operations necessary for bulk import when bulk import commences.

14. A bulk import system for a directory server, comprising:
a processor;
a memory,
extended operations for bulk import defined on a server and a client; and
software instructions residing in memory executable on the processor for performing a series of LDAP add operations framed by extended operations for bulk import to import an plurality of entries into the directory server.

15. The system of claim 14, further comprising:
a back-end portion for use by a fast replica initialization component and a wire import component.

16. The system of claim 14, further comprising:
a fast replica initialization component comprising a front-end portion; and
a back-end portion connected to the front-end portion, wherein an LDAP protocol is transferred between the front-end portion and the back-end portion to import a plurality of entries and any state information contained in the plurality of entries into the directory server.

17. The system of claim 14, further comprising:
a wire import comprising a front-end portion; and
a back-end portion connected to the front-end portion, wherein an LDAP protocol is transferred between the front-end portion and the back-end portion to import the plurality of entries into the directory server.

18. The system of claim 14, further comprising:
state information contained within the plurality of entries.

19. The system of claim 14, further comprising:
an object identifier that identifies the extended operations for bulk import.

20. The system of claim 14, wherein the plurality of entries is remotely imported.

21. The system of claim 14, wherein all operations are suspended except LDAP operations necessary for bulk import when bulk import commences.

22. A bulk import system for a directory server, comprising:
a processor;
a memory,
extended operations for bulk import defined on a server and a client;
software instructions residing in memory executable on the processor for performing a series of LDAP add operations framed by extended operations for bulk import to import plurality of entries into the directory server;
a back-end portion for use by a fast replica initialization component and a wire import component;
state information contained within the plurality of entries; and
an object identifier that identifies the extended operations for bulk import.

23. A bulk import apparatus for a directory server, comprising:
means for defining extended operations for bulk import on a server and a client; and
means for importing a plurality of entries into the directory server using the extended operations for bulk import.

24. A bulk import apparatus for a directory server, comprising:
means for defining an extended operation for bulk import on a server and a client;
means for sending an extended operation request from the client to the server;
means for performing the extended operation for bulk import after receiving the extended operation request from the server;
means for sending a response of the server back to the client specifying an object identifier of the extended operation and data specific to the extended operation; and
means for performing a series of LDAP add operations framed by the extended operations for bulk import to import a plurality of entries into the directory server.

* * * * *